L. R. WINSLOW.
GENERAL VOTING MECHANISM.
APPLICATION FILED APR. 13, 1907.

966,633.

Patented Aug. 9, 1910.
10 SHEETS—SHEET 1.

WITNESSES:

Lenna R. Winslow,
INVENTOR.
By C. A. Snow & Co.
ATTORNEYS

L. R. WINSLOW.
GENERAL VOTING MECHANISM.
APPLICATION FILED APR. 13, 1907.

966,633.

Patented Aug. 9, 1910.

10 SHEETS—SHEET 3.

WITNESSES:

Lenna R. Winslow  INVENTOR

By C. A. Snow & Co.
ATTORNEYS

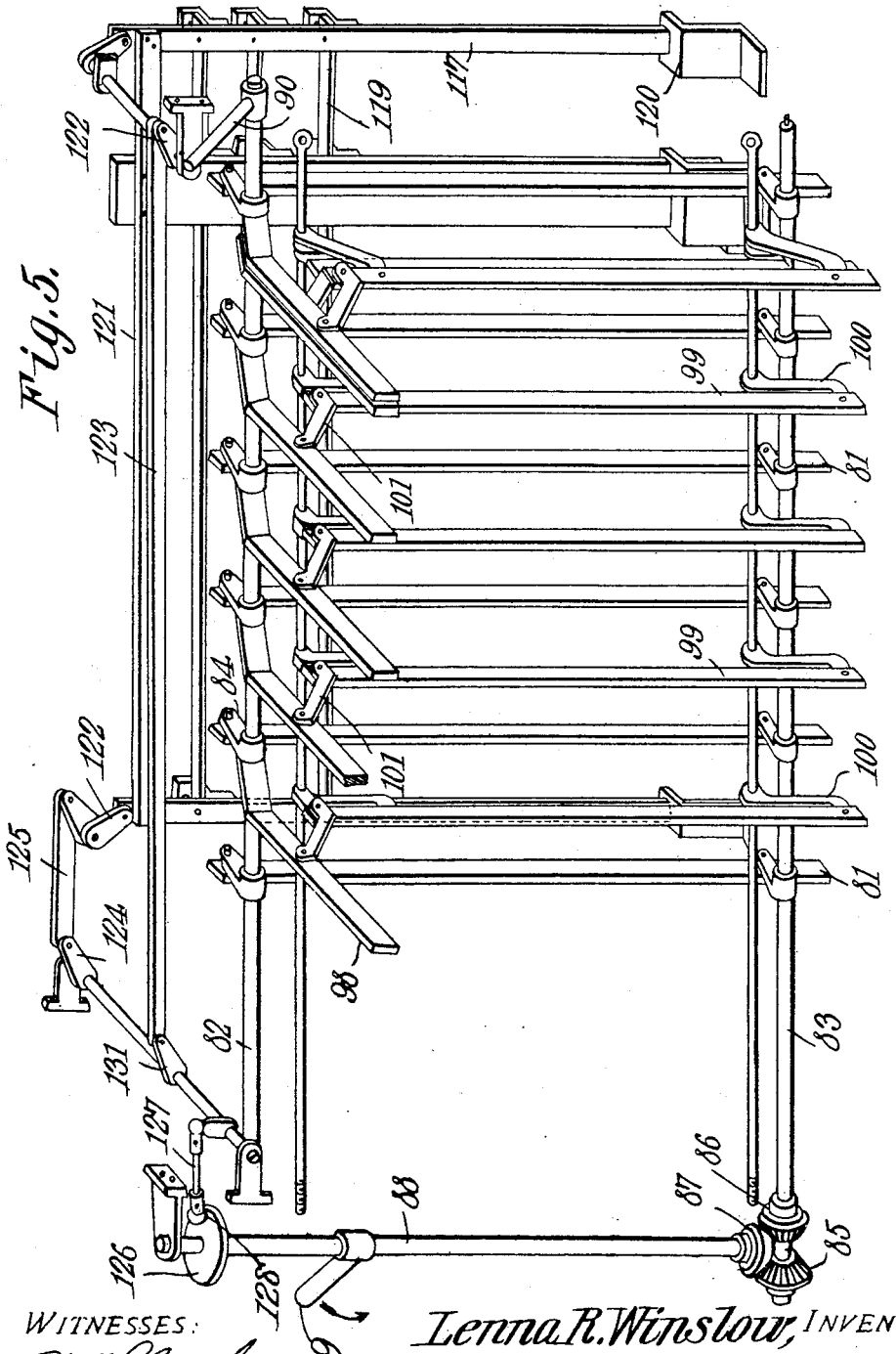

L. R. WINSLOW.
GENERAL VOTING MECHANISM.
APPLICATION FILED APR. 13, 1907.
966,633.
Patented Aug. 9, 1910.
10 SHEETS—SHEET 6.
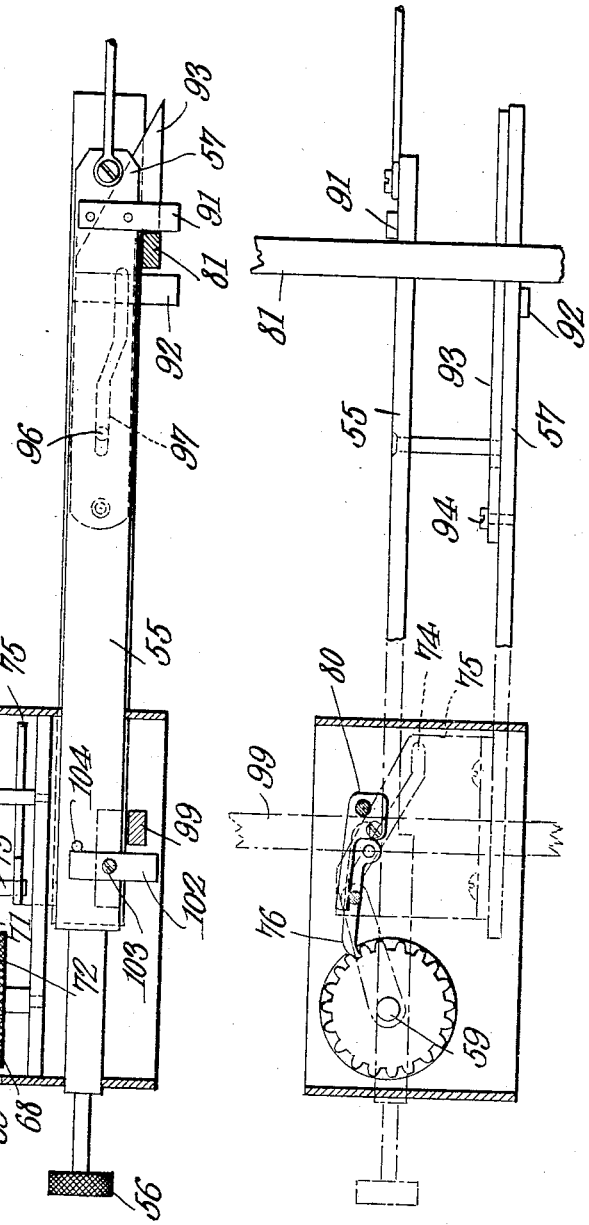
Lenna R. Winslow,
INVENTOR.
WITNESSES:
By C. A. Snow & Co.
ATTORNEYS L. R. WINSLOW.
GENERAL VOTING MECHANISM.
APPLICATION FILED APR. 13, 1907.
966,633.
Patented Aug. 9, 1910.
10 SHEETS—SHEET 7.
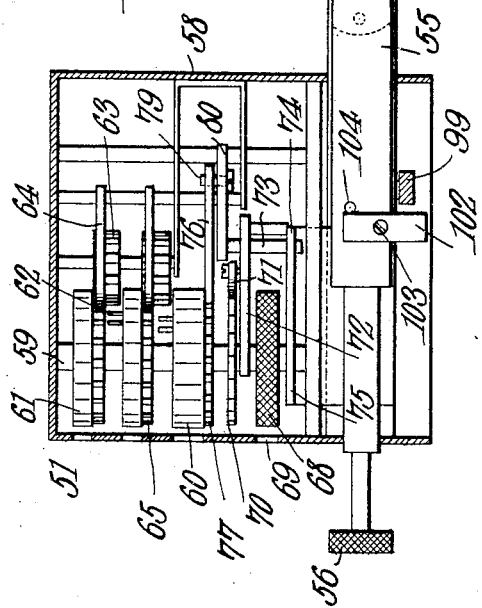
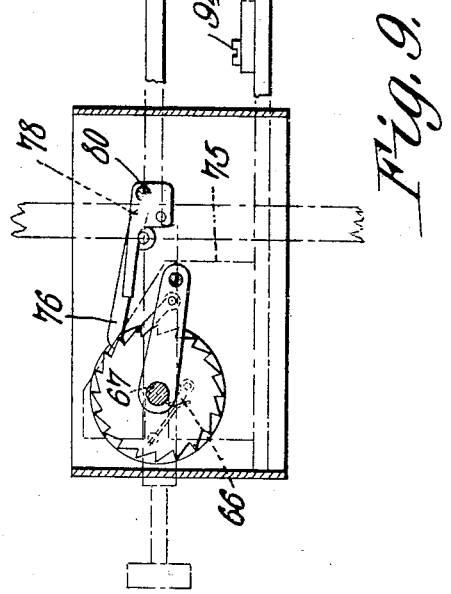
WITNESSES:
Lenna R. Winslow,
INVENTOR.
By C. A. Snow & Co.
ATTORNEYS

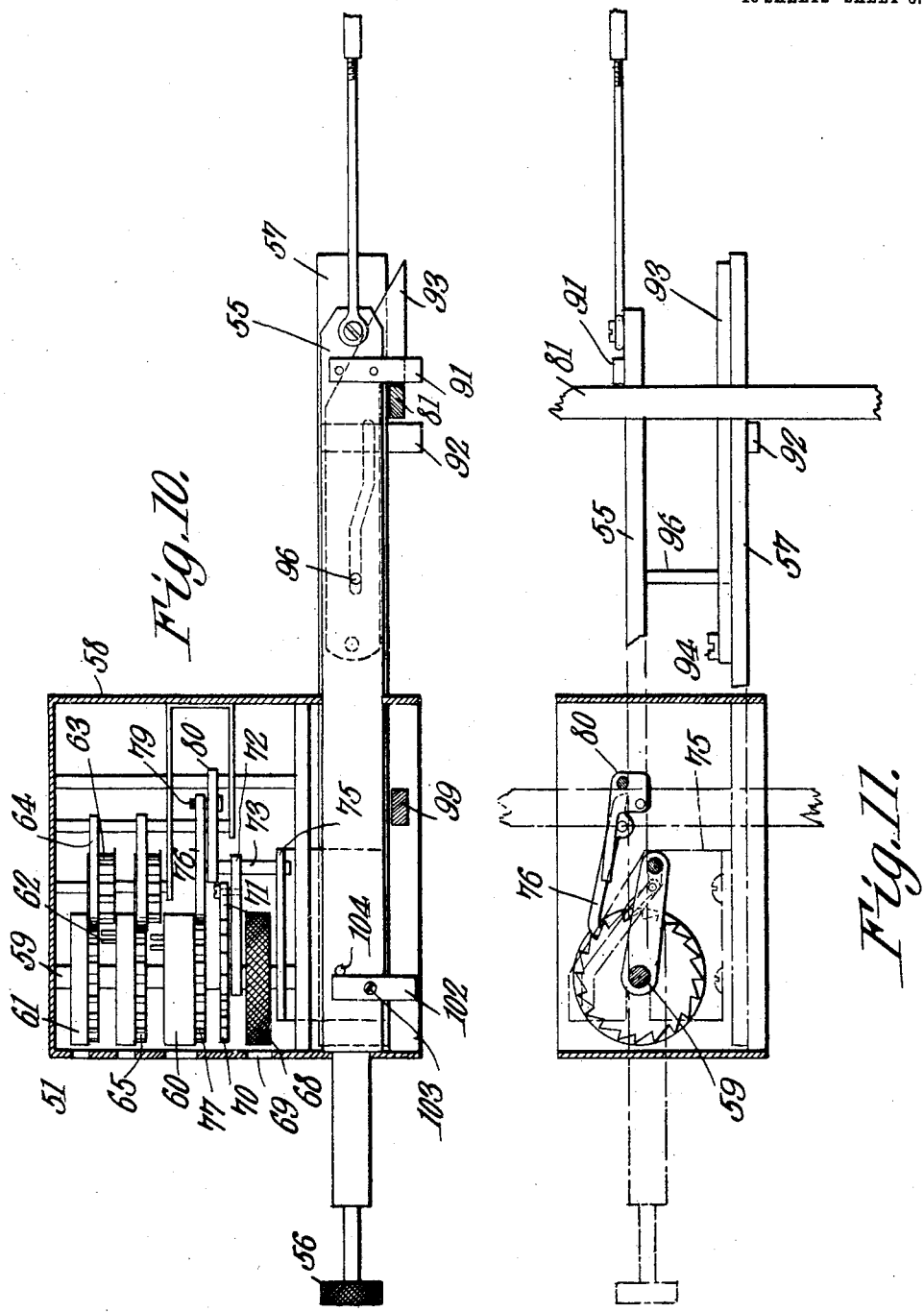

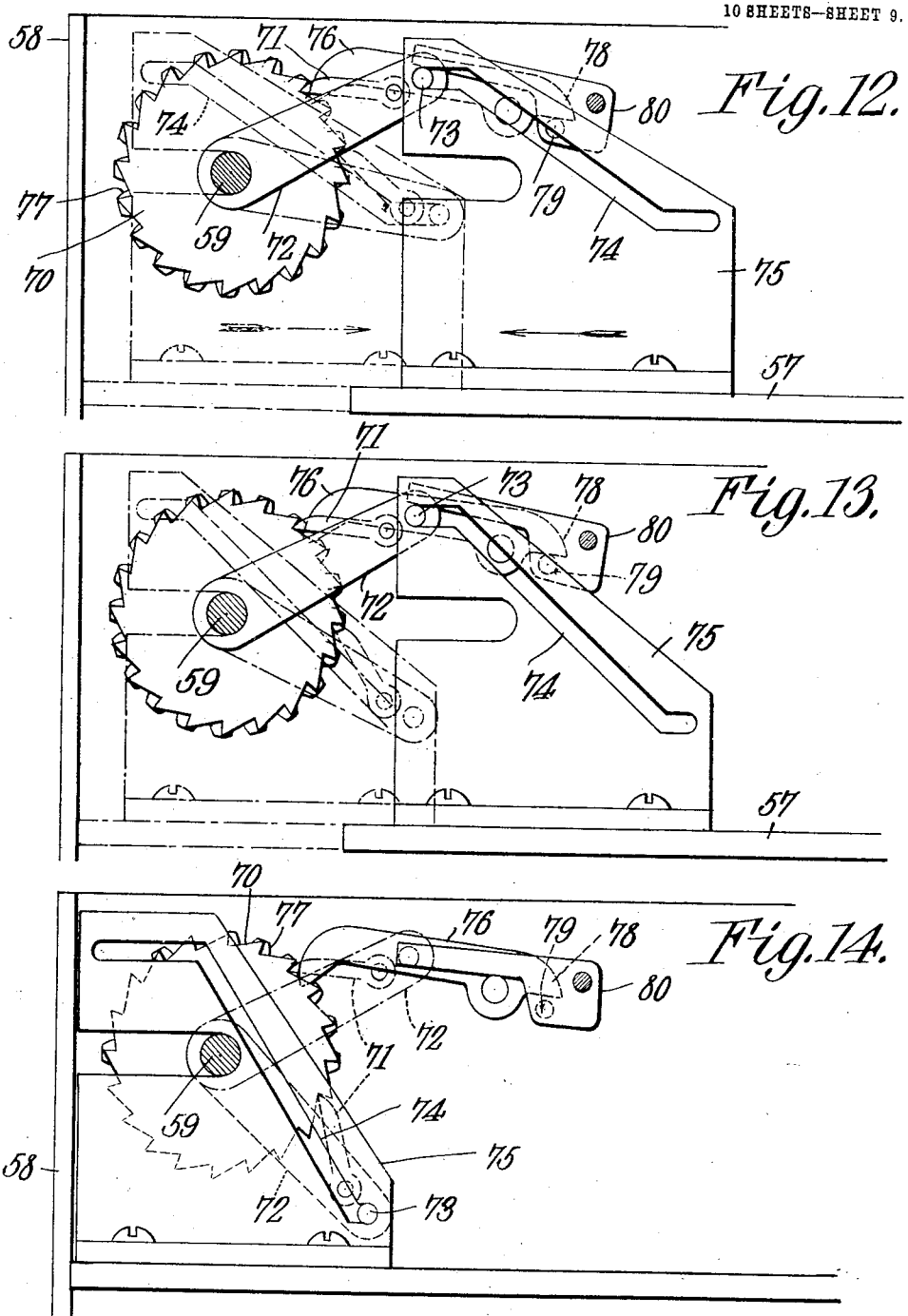

L. R. WINSLOW.
GENERAL VOTING MECHANISM.
APPLICATION FILED APR. 13, 1907.
966,633.
Patented Aug. 9, 1910.
10 SHEETS—SHEET 10.
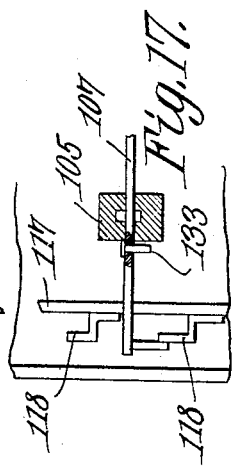
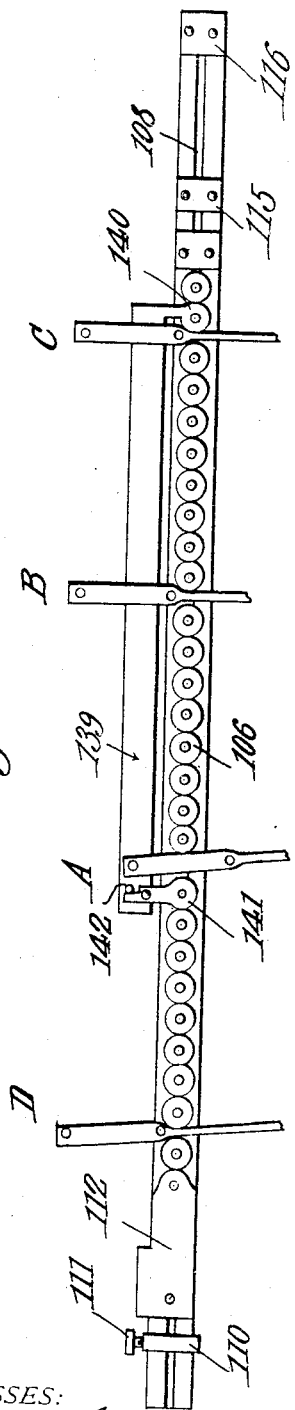
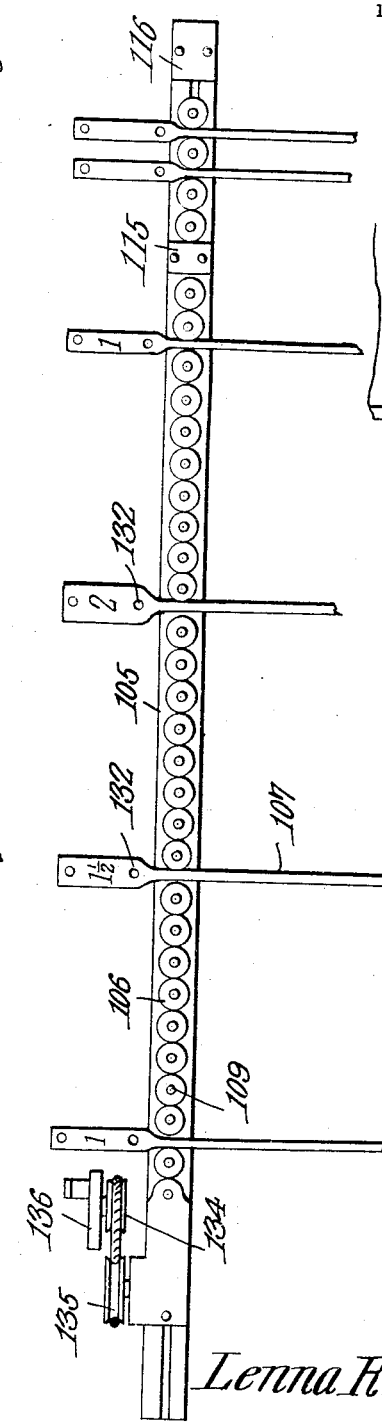
WITNESSES:
Lenna R. Winslow,
INVENTOR.
By C. A. Snow & Co.
ATTORNEYS

UNITED STATES PATENT OFFICE.

LENNA R. WINSLOW, OF CHICAGO, ILLINOIS.

GENERAL VOTING MECHANISM.

966,633.  Specification of Letters Patent.  Patented Aug. 9, 1910.

Application filed April 13, 1907. Serial No. 368,090.

*To all whom it may concern:*

Be it known that I, LENNA R. WINSLOW, a citizen of the United States, residing at Chicago, in the county of Cook and State of Illinois, have invented a new and useful General Voting Mechanism, (Case H,) of which the following is a specification.

Figure 1:
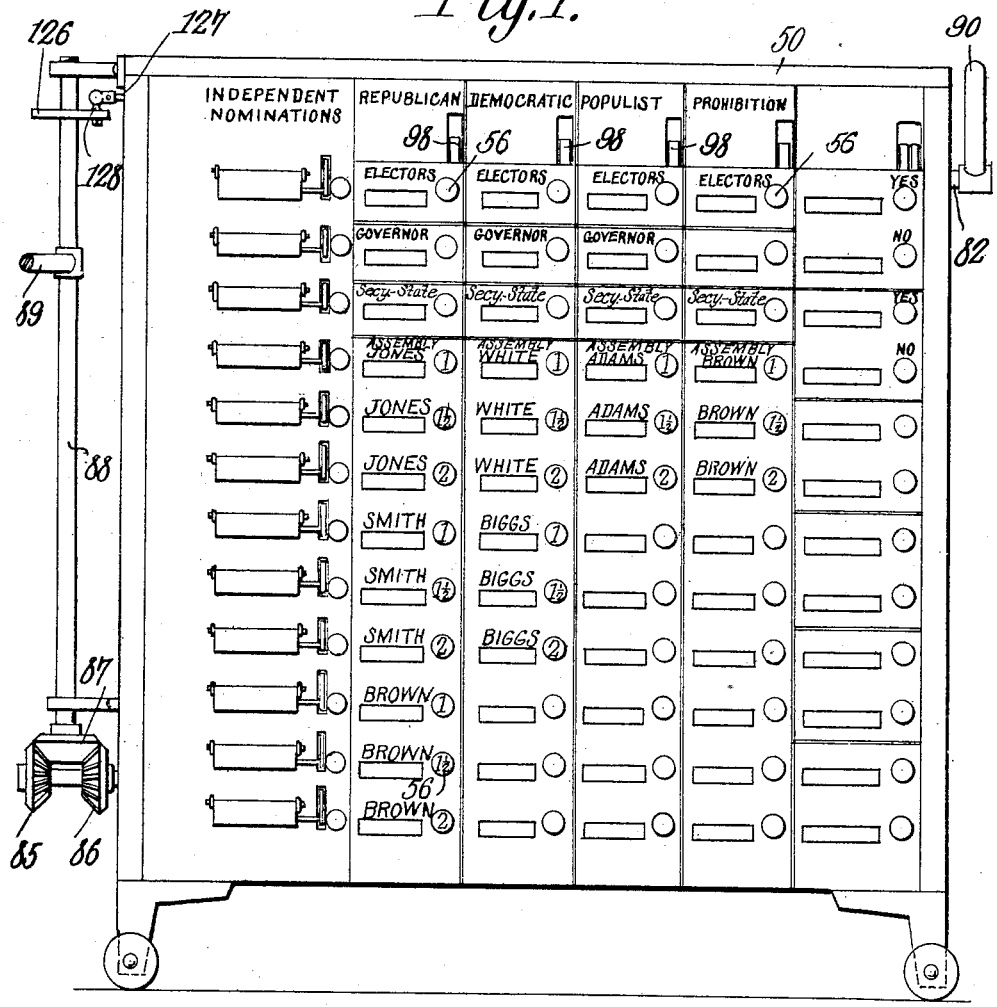
Figure 2:
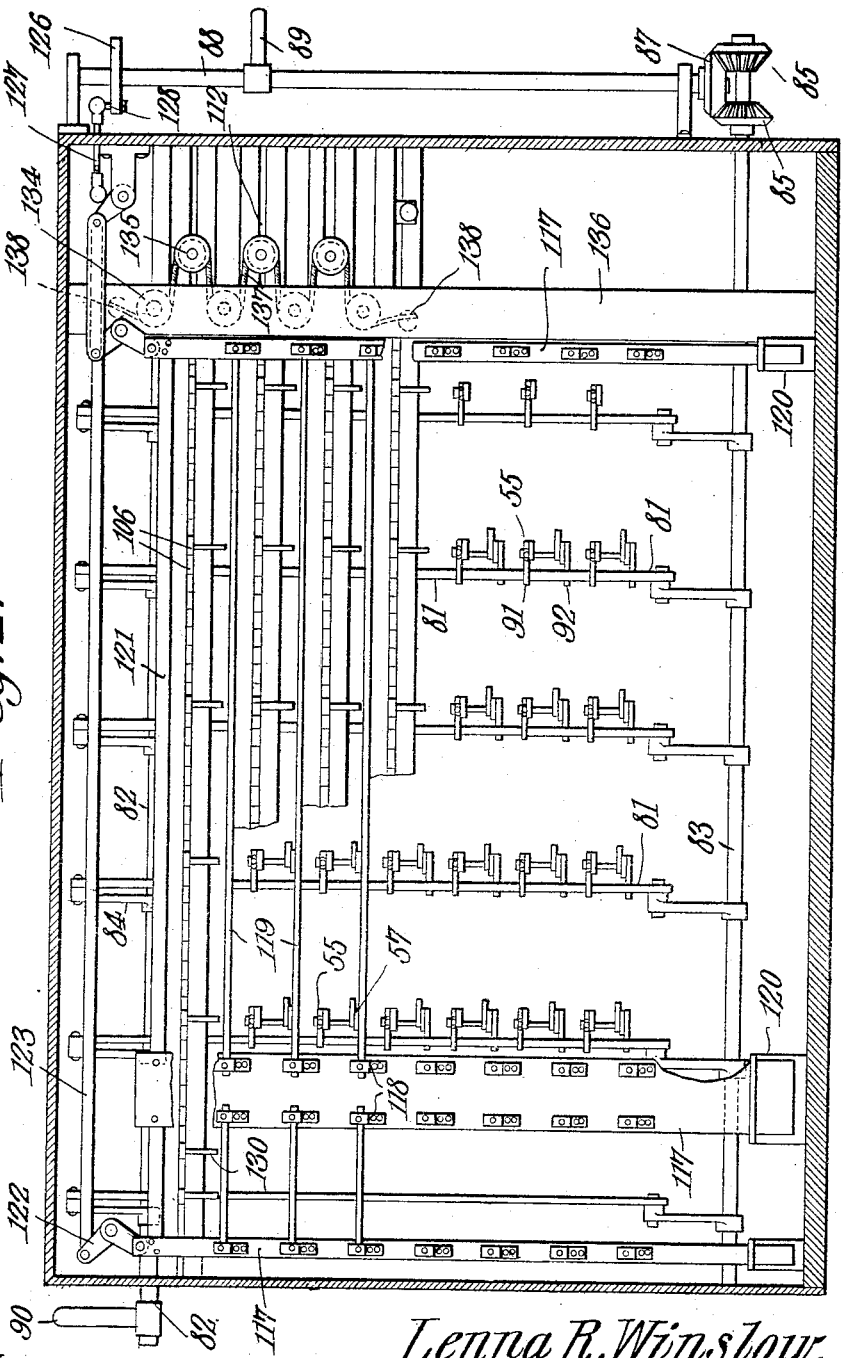
Figure 3:
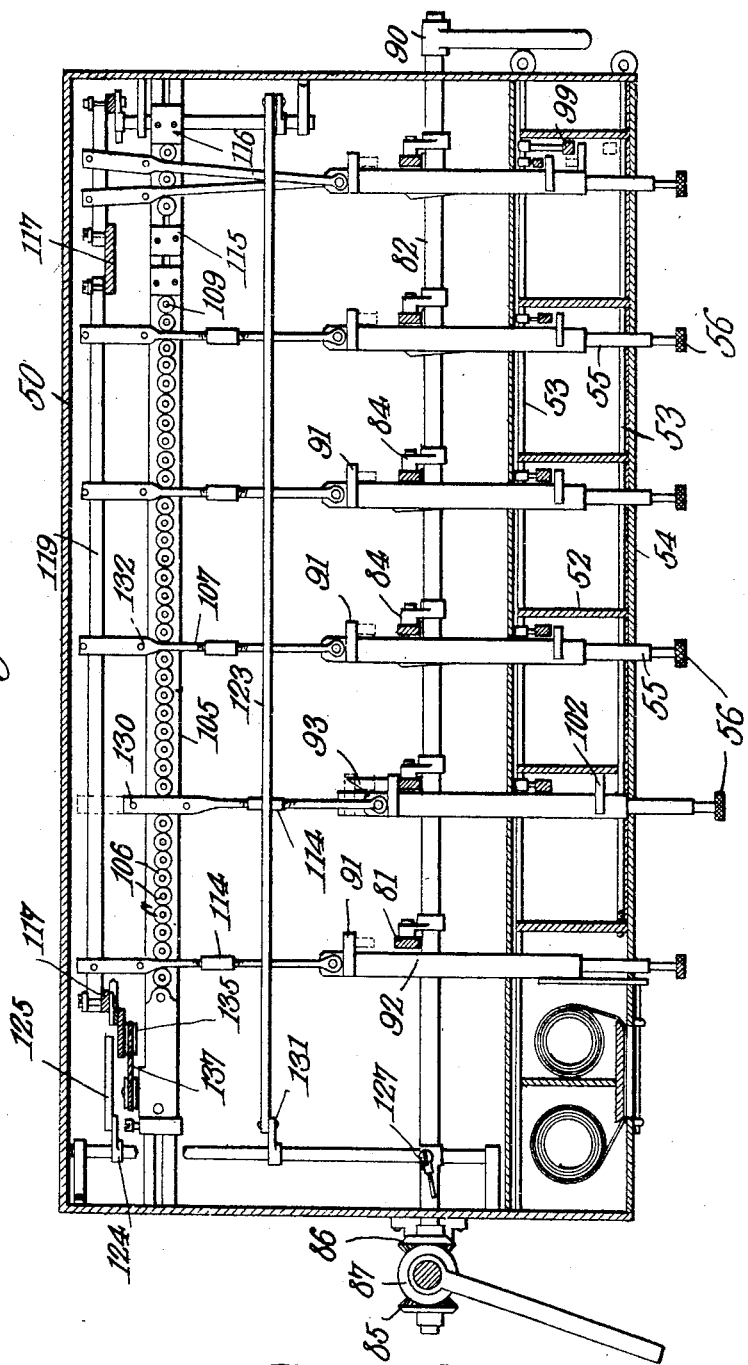
Figure 4:
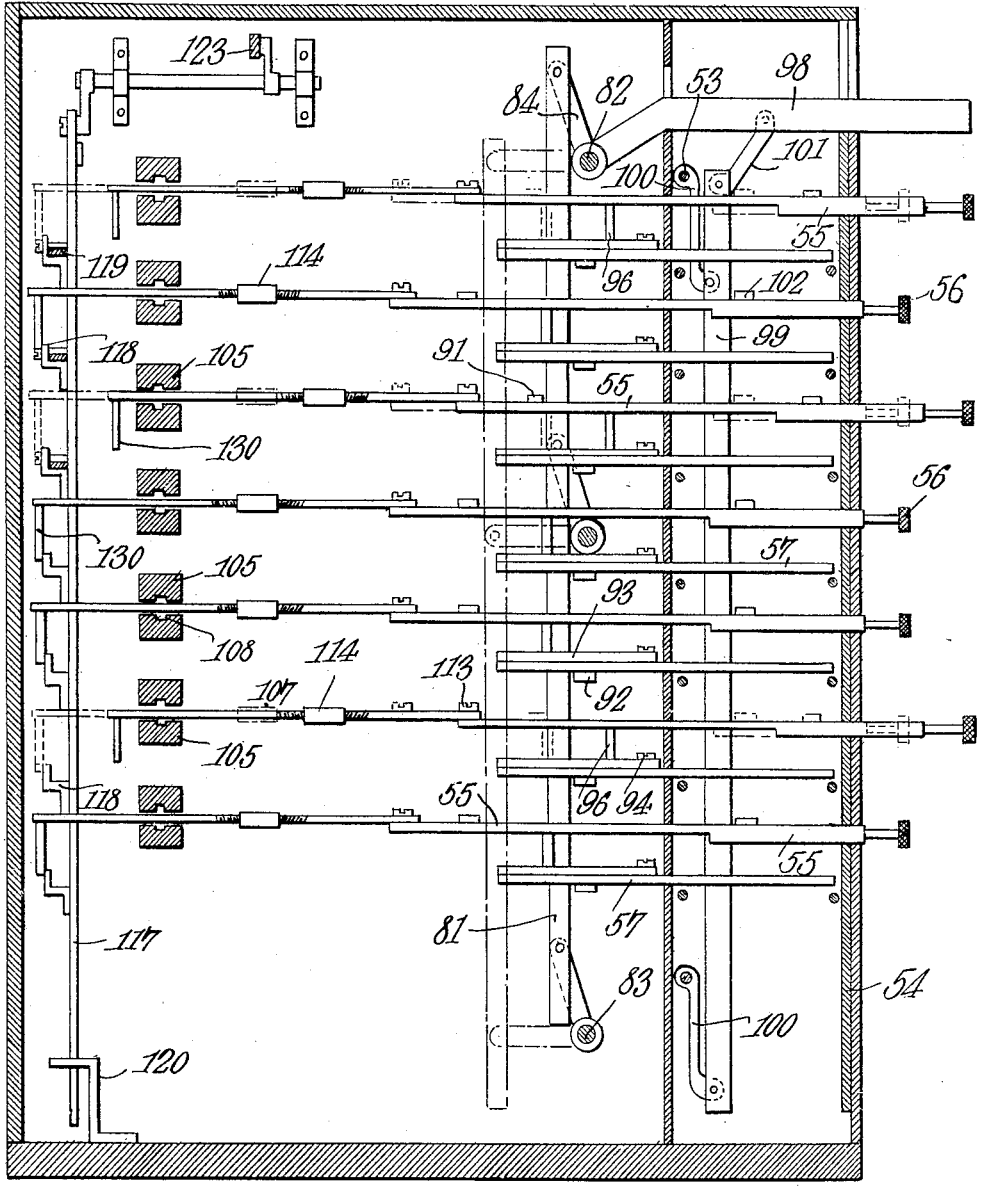

The invention relates to voting machines, and in the preferred embodiment thereof Figure 1 is a front view of the machine. Fig. 2 is a longitudinal vertical section looking at the rear of the mechanism. Fig. 3 is a horizontal sectional view. Fig. 4 is a vertical transverse sectional view. Fig. 5 is a detail perspective view showing the setting and replacing mechanism. Figs. 6 and 7 are, respectively, plan and side views of the counter-actuating and tally mechanisms showing the parts in one position. Figs. 8 and 9 are views of the same parts showing the elements in a second position. Figs. 10 and 11 are views of the same parts showing the elements in a third position. Figs. 12, 13 and 14 are detail views of the counter-actuating devices showing different counter-throwing devices. Figs. 15 and 16 are detail plan views of the main interlocking devices which coöperate with the voting elements. Fig. 17 is a detail vertical sectional view to show the arrangement of the individual lock-out pins.

The kinds of voting contemplated by the machine herein described are individual or single-office voting (in which may be included proposition or amendment voting since the same mechanism is employed in both), class or combination voting (in which may be included minority representation voting, since the same mechanism with a slightly different adjustment is employed therein), cumulative voting, independent voting, and straight ticket voting.

In the illustrated embodiment of the invention the face or front wall of the casing inclosing the voting mechanism is provided with spaces or stations representing and designated by the names of different candidates for election, and for convenience these spaces or stations are arranged in intersecting rows or series, the horizontal rows being designated as office rows in that they are set apart, respectively, for the names of candidates for different offices such as governor, lieutenant governor, mayor, assemblymen, etc., while the vertical rows are designated as party rows or columns, inasmuch as the spaces or stations therein are set apart, respectively, for different political parties such as Republican, Democratic, Populist, Independent, etc., it being understood that the term "Independent" as used herein refers to independent nominations to provide for the selection by the voter of a non-nominated candidate, rather than as a party by that name. The individual or single-office voting mechanism, including the proposition or amendment voting mechanism, is constructed and arranged to provide for the manipulation by the voter of individual keys or actuating means for each candidate selected, as distinguished from the straight ticket voting mechanism, which provides for the actuation of a plurality of means relating to counters or tally mechanisms allotted to a particular political party, while the class or combination voting mechanism which includes that designed for minority representation voting, is constructed with reference to its limiting means to provide for the separate manipulation of the keys in either or all of a combined series of horizontal or office rows, to permit the successive actuation of a prescribed number of keys in either or any of the rows arranged in that combination.

The independent voting mechanism provides for the substitution for any or all of the nominated candidates of a name or names selected by the voter regardless of party, while the restrictive or lock-out mechanism embodies means to prevent a voter having a limited franchise from voting for offices or on questions not included in their privilege.

The present invention relates particularly to the general voting mechanism, or, in other words, to the means for actuating the counters or tally mechanisms either independently or separately or collectively as in straight-ticket voting, and to the means for resetting the actuated parts as the voter respectively leaves and enters the booth or inclosure in which the voting mechanism is accessible, while the counter or tally mechanism proper as disclosed herein forms the subject of a separate application. Also forming a separate application herefrom but constituting an essential feature of a complete machine and described herein for the purpose of clearness, are the means for controlling and limiting the setting of the different parts of the mechanism preliminary to the actuation of the counter mechanisms, and the setting of the restrictive or lock-out means by which voters of limited franchise are prevented from voting for offices or questions outside of their privilege, the same means which are employed for preventing the repeating of a vote or the voting improperly for two candidates for the same office being employed to prevent the improper simultaneous or successive operation of the means which control the independent voting mechanisms, but as hereinbefore indicated, the machine is of that type wherein the setting of a voting key or of a plurality of voting keys, as by the straight-ticket actuating device, does not prevent the subsequent replacement of any or all of the operated keys and the resetting thereof or of other keys so that a mistake by a voter in manipulating the wrong key or series of keys may be corrected without affecting the counter mechanism, inasmuch as the machine is merely set for the vote while the voter is within the inclosure or booth, while the actual operation of casting the votes or of actuating the counter mechanisms is not effected until the voter leaves the booth, when the operation of all of the counter mechanisms connected or in operative relation with those keys which have been set is accomplished simultaneously.

The casing 50 in which the voting mechanism is inclosed is provided in its front wall with series of openings through which the dials of the counter or tally mechanisms 51 may be viewed, said counter or tally mechanisms being supported between vertical partitions 52 on horizontal rods 53, or the equivalent thereof, a suitable shutter 54 being employed to normally close the openings in the face or front wall of the casing to exclude view from the counter dials with the exception, if preferred, of the units dial. Located adjacent to each counter is a counter-actuating device consisting (in the individual voting mechanisms) of a voting key 55 which projects forward through a suitable opening in the face or front wall of the casing and is provided with a terminal button or grip 56, and a counter-actuating slide 57 located parallel with and preferably beneath the key and designed to serve as the direct means of communicating motion from the operating and resetting device to the counter mechanisms.

The counter mechanisms consist of boxes 58 in each of which is mounted an arbor 59 carrying a units dial 60 and a plurality of dials of higher denomination 61, and which are respectively employed to represent tens, hundreds, thousands, etc., motion from a dial of lower denomination to one of higher denomination being communicated by means of pins 62 on the former engaging spur wheels 63 meshing with gears 65 on the latter whereby each complete revolution of a dial of lower denomination causes one advance step of the dial of next higher denomination, backward movement of the spur wheels 63 being prevented by dogs 64. Each counter dial is loosely mounted on the arbor and carries a pawl 66 adapted to be engaged by a notch or groove 67 in the arbor whereby as the dials are turned forward in the operation of voting the pawls slip idly over the groove, but after the conclusion of the voting all the dials may be set to zero by turning the arbor in the same direction as the dials have been moved to cause the said groove to engage the pawls and thus arrange the zero designations of the dials opposite the inspection openings in the face plate. The turning of the arbor is effected by means of a milled or knurled disk 68 fixed to the arbor and accessible through an opening 69 in the front wall of the box. Fixed to the units dial, which is preferably provided with half step designations, as one, one and one-half, two, two and one-half, etc., is a ratchet 70 with which engages an operating pawl 71 carried by an arm or lever 72 mounted to swing on the arbor whereby each upward movement of the free end of the arm or lever causes an advance movement of the ratchet, and, therefore, of the units dial, and this arm or lever carries a pin 73 engaged by a cam 74 on the counter-actuating slide. This cam preferably consists of a slot formed in a plate or ear 75, and the extent of throw of the units dial, therefore, depends upon the pitch of the cam as will be hereinafter more particularly explained. To prevent overthrow of the counter mechanism due to a sudden operation of the parts or a forcible movement of the counter-actuating slide, a lock is provided consisting of a pawl 76 arranged to engage a spur wheel 77 on the units dial and having a tail 78 arranged in the path of a pin 79 carried by a locking arm 80 arranged in the path of the pin 73. As this pin 73 carried by the ratchet operating arm or lever reaches the limit of its upward movement caused by the cam on the counter-actuating slide it raises the arm 80 to bring its pin 79 into contact with the tail of the locking pawl 76 and thus forces the nose of the locking pawl into engagement with the spur wheel 77 and prevents excessive movement of the latter. It will be seen that to set the key so that a vote will be cast for the candidate arranged in that space it is necessary to draw the key forward or in the direction indicated by the full line arrow in Fig. 12, whereas the movement of the slide to effect the operation of the counter mechanism is in the opposite direction or rearward, as shown by the dotted arrow.

The means for actuating the slides forming members of the voting devices consist, in the construction illustrated, of a frame mounted for forward and rearward movement and having a plurality of vertical bars or members 81 connected terminally with rock-shafts 82 and 83 (the operation of this operating and resetting frame being best illustrated in Figs. 3, 4 and 5) by arms or links 84. The lower of said rock-shafts extends through the end wall of the casing and is provided with oppositely facing bevel gears 85 and 86 with either of which will mesh a mutilated bevel gear 87 carried by a vertical shaft 88 having a handle or operating lever 89. When this arm 89 is swung in the direction indicated by the arrow in Fig. 5 it causes the gear 87 to mesh with the gear 85 and thus turn the shaft 83 to throw the operating and resetting frame into forward or full-line position shown in Fig. 4, and full-line position shown in Fig. 3. The upper shaft 82, on the other hand, projects through the opposite end wall of the casing and carries an operating arm or handle 90, which is adapted to be actuated by the voter in leaving the booth or inclosure to turn the rock shafts, and thus move the operating and resetting frame in the opposite or rearward direction to the dotted-line position indicated in Fig. 4 and dotted-line position indicated in Fig. 3. The vertical members or elements 81 of the operating frame are located respectively adjacent to the vertical series or tiers of counter-actuating devices in front of projections 91 extending laterally from the voting keys or operating members of the counter-actuating device, and also adjacent to but in front of projections 92 on the slides or operated members of the counter-actuating devices is a movable catch 93 pivoted, as shown at 94, and having a shoulder 95 adapted to be arranged in rear of the operating element 81 when the catch occupies the position illustrated in Fig. 10, and with the parts in these relative positions it is obvious that a rearward movement of the operating and resetting frame would cause a simultaneous rearward movement of both elements of the counter-actuating device and thereby cause a counting movement of the counter. An opposite movement of the operating or resetting frame will restore the slides or operated elements to their normal positions. The setting of the catches 93 so as to be affected by the operating frame is effected by means of the keys 55, each of which is provided with a depending pin 96 coöperating with a cam, preferably a slot, 97 of the catch. As the key is drawn forward from the position shown in Fig. 8 to the position shown in Fig. 10 to set the devices for casting a vote the configuration of the cam causes the lateral projection of the shouldered end of the catch 93 to move into the path of the rearward movement of the element 81 of the operating frame, and if the parts are permitted to retain these positions until the voter leaves the booth the operation of the lever 90 will cause the operation of the slide 57 and hence the actuation of the counter. Should it be desired to change the vote after having set the key 55 the latter may be repressed without affecting the counter mechanism. This may be done as frequently as desired, and only those counter mechanisms connected with slides of which the catches 93 have been set in their projected positions will be affected by the operation of the lever 90 in leaving the booth.

Intimately related with the above described mechanism is the straight-ticket voting mechanism which embodies a series of straight-ticket levers or actuating devices 98 mounted loosely upon the rock-shaft 82 and adapted to be elevated by means of their front ends projecting through slots in the face or front wall of the casing. Within the casing are vertical bars 99 suspended from links 100 and connected with the levers 98, respectively, by links 101. The bars 99 are arranged in rear of stops or projections 102 on the keys or operating members 55. The elevation of the front end of one of the straight-ticket levers will cause a movement of the connected bar 99 to cause the advance of all of the keys of which the stops or projections 102 are extended, as shown in Fig. 11, but as in some classes of voting it is impossible to use a straight-ticket operating means these stops or projections are pivoted as at 103, to the keys and are adapted thus for extension as shown in full lines in Fig. 6, or for folding into the dotted-line position indicated in the same figure, the same being held in the extended position in contact with stop pins 104. Obviously, the simultaneous operation of a plurality of the keys by the operation of a straight-ticket lever will cause the simultaneous projection of the corresponding catches 93 whereby on the succeeding rearward movement of the operating frame the related slides and counters will be actuated.

The locking and interlocking mechanism employed to regulate the number of keys which can be operated by a voter and for limiting him in individual or single-office voting to one key for each office whether the operation thereof be accomplished by the separate actuation of the different keys or by the operation of the straight-ticket lever, consists essentially of guides 105 arranged parallel, respectively, with the office rows of voting mechanisms, and carrying blocks 106 between which operate spreaders 107 carried respectively by the keys or operating elements of the counter-actuating devices. In the construction illustrated each guide consists of upper and lower bars spaced apart sufficiently to permit the spreaders to pass therebetween and provided in their facing surfaces with guide grooves 108 in which operate trunnions 109 on the blocks 106 which are constructed in the form of rollers. The body portions of the rollers are arranged in the intervals between the bars forming the guide, and hence are in the same plane with the spreaders. The extent of movement of the blocks in the guide is limited in individual or single-office voting (and also in one or two other classes of voting, as hereinafter explained) by an adjustable stop 110 constructed as illustrated in the form of a collar to engage the guide, and having a set-screw 111 to secure it at the desired adjustment, and, preferably, a terminal follower or slide 112 is employed for contact with this stop, and designed to receive the thrust of the adjacent block or roller 106. By locking the stop so as to permit the spreading of the blocks to admit only one spreader, it is obvious that when a voting key has been advanced or set and the large portion of its attached spreader arranged in the guide, the rollers throughout that horizontal series are held in contact and no other spreader in that series can be introduced. This, obviously, locks all of the remaining keys in that series and prevents two or more from being set to vote. The spreaders are pivotally connected, as at 113, to the keys and are preferably made in sections with an intermediate turn buckle 114 to provide for accurate adjustment of the enlarged portion of the spreader with reference to the guide.

The amendment and proposition voting devices shown at one end of the machine embody counters or tally mechanisms such as those above described, and also embody counter-actuating devices corresponding with those employed in connection with the individual and single-office voting devices, with the exception that the keys or operating members are arranged in pairs designated, respectively, "Yes" and "No," as shown clearly in Fig. 1, with the spreaders connected, respectively, with the "Yes" and "No" keys of the same pair arranged to operate in the same guide as best shown in Figs. 3 and 16, said spreaders being arranged side by side and fixed stops or blocks 115—116 being employed to limit the spreading movement of the blocks 106 so as to permit the introduction of only one spreader into the guide and thus prevent voting both for and against the same proposition. Introduction of one spreader occupies the entire available space, and while the key after being advanced can be returned so as to permit operation of the other key, both cannot occupy the advanced position at the same time.

It is sometimes desirable to provide for straight-ticket operation of the voting devices assigned to propositions and amendments, and for this purpose the keys are fitted with the intermediately pivoted projections 102, hereinbefore described in connection with the individual voting mechanism, but the projections which are attached, respectively, to the "Yes" and "No" keys are arranged at different distances from the front of the machine, or, in other words, are arranged in different vertical planes, and the projection which is attached, for instance, to the "No" key projects beyond the plane of the outer end of the projection attached to the "Yes" key shown in Fig. 3, whereby they are in position, respectively, for engagement and operation by the straight-ticket bars 99, two of which are employed for the amendment or proposition column, but which are constructed, arranged and operated precisely in the same way as hereinbefore described with reference to the individual voting mechanisms. This provides for simultaneously setting all of the keys relating to one side of a question without affecting the others, the limits of movement of the bars 99, as indicated by dotted lines in Fig. 3, being such as to prevent interference of one with the other. It will be noted that the straight-ticket lever must be elevated to set the keys, but is not provided with any means for holding it in that position, and, therefore, after a straight-ticket lever has been raised to set the keys in that position it drops back to its normal position so that either or all of the keys which have been set by this lever can be pushed back to their normal position to provide for substituting other keys or to change the vote. For instance, the voter may operate a straight-ticket lever and desire to cast a vote for the straight-ticket with one exception. Selecting the key as to that particular nominee he can replace it separately and then the mechanism is free to be operated so far as any other key in the same office series is concerned.

The means for restricting the voting operation or locking out certain voting devices to prevent their operation by restricted voters or those not having an unlimited franchise, consist of a frame having uprights 117 provided with seats 118 for the reception of limiting rods 119, said bars being mounted in suitable guides 120 at their lower ends and having their upper ends joined by a cross bar 121 and connected with bell-crank levers 122 which in turn are connected by a horizontal bar 123 to cause simultaneous movement thereof. A bell crank 124 is connected by a link 125 with one of the terminal bell cranks 122, and is also connected by suitable mechanism with the operating shaft 88. In the construction illustrated this mechanism consists of a disk 126 and a link 127, the latter being adjustable as to length and connected at one end with an arm of the bell crank 124 and at the other end with the disk. The connection of the link 127 and the disk 126 is preferably formed by a stud or projection 128 on the link engaging an opening in the disk whereby when the shaft 88 is turned in one direction the connections are not affected, and, therefore, the restricting frame is not operated, but when the shaft 88 is turned in the opposite direction tension is applied to the link 127 to operate the bell crank 124, and thus through the connections hereinbefore described elevate the restricting frame to bring its rods 119 into the plane of and in front of depending pins 130 on the spreaders, respectively, connected with the voting keys. One of these limiting rods 119 may be arranged in operative relation with any horizontal row of voting keys, and when the restricted voter enters the booth the lever 89 is moved in the opposite direction from that indicated by the arrow to bring the restricting frame into operative position and thus lock out such rows as such voter is not entitled to operate. In the construction illustrated the the bell crank 124 consists of a rock-shaft having a plurality of arms to which the different connected elements are attached, and including an arm 131 connected by the link 123 with a similar arm on the bell crank 122 located at the opposite end of the machine. In order to lock out a particular key in case of there being no necessity for its use by reason of there being no nomination, each spreader is provided with an opening 132 into which may be dropped an auxiliary locking pin 133, which, by contact with the rear side of the guide prevents the advance movement of the key.

For regulating the number of keys to be operated in group or class voting, where two or more office rows are to be combined and the voter is entitled to cast more than one vote in the series, the mechanism employed consists of a series of pulleys 134 and 135 mounted, respectively, on the bar 136 forming a part of the frame or other suitable part of the casing, and the movable blocks 112, and a flexible connection such as a chain, cable or cord 137 extending around the requisite number of these pulleys and terminally secured by binding posts 138 to bar 136. When this mechanism is employed the stops 110 are not required, but the length of the flexible connection is so adjusted as to permit the introduction into the guides of the several series thus combined or grouped of a number of spreaders corresponding with the number of votes to which the voter is entitled. This arrangement is clearly shown in Fig. 2. For instance, if the voter is entitled to cast three votes in the series of three office rows the cable is adjusted so that the movement of any of the slides in either of the rows sufficient to dispose three spreaders in the guides will take up all of the slack in the flexible connection and thus prevent any further spreading of the blocks. The voter can operate the three keys in one row, or two of one row and one of another, or one in each of the three rows, but in either event the operation is limited to three keys. It is obvious that any desired number of rows can be combined in this manner and the cable set to permit the required number of keys to be operated.

In the combination series of horizontal rows where a candidate has been introduced by two or more parties, that is, if his name appears two or three times in one office row and the voter is only entitled to cast one vote for each candidate, an auxiliary interlock is employed, as best shown in Fig. 15, and which consists of a bar 139 adapted to be disposed in rear of the guide, and having a fixed disk 140 at one end and a pivoted disk 141 at the other end, both disks occupying a position in the guide, and the pivoted disk being arranged in operative relation with a stop pin 142. If the voter operates either of the keys connected with the spreaders which are designated, respectively, by the letters A, B and C, it will spread the blocks or disks 106 and move the pivoted disk 141 outward until it is checked by the stop pin 142, and, therefore, neither of the other two keys in that series embraced by this auxiliary lock can be operated, but this device will not prevent the operation of a spreader located in that portion of the series outside of this auxiliary lock, as, for instance, the spreader D. Either of the keys A, B, C can be operated to bring its spreader within the guide, but the auxiliary device prevents the operation of more than one.

In minority representation voting where the office is to be filled by two or more officers and the voter is entitled to vote for less than the number of offices to be filled, or, for example, where each political party nominates four candidates and the voter is entitled to vote for but three, it is necessary to combine or group four office rows of voting keys, but allow slack in the cable or flexible connection 137 only sufficient to permit the operation of three keys, and in order that the straight-ticket voting mechanism may be used in the machine when one or more rows are combined for minority representation voting, the straight-ticket projections 102 are pivoted as hereinbefore described to permit them to be moved to their dotted line positions. Thus, in operating the straight-ticket lever those keys set aside for minority representation voting would not be affected, but can be independently operated to the extent permitted by the limiting means consisting of the flexible connection.

While this machine also contemplates independent voting mechanism, such devices do not form a part of the invention covered by this application, and, therefore, have been shown only incidentally and in a general way in this case and form the subject-matter of a separate application for patent.

In cumulative voting where the voter is entitled, for instance, to three votes for members of the general assembly, he may give one vote to each of the three candidates, or he may split his vote giving one and one-half votes to each of two candidates, or he may apply all three votes to one candidate, or two votes to one candidate and one to another, and to provide for this operation it is necessary to employ means for giving the counter an accurate movement according to the number of votes to be cast by one operation of a key. This is accomplished by using cams 74 of different lengths or pitch whereby one operation of a slide will give the lever 72 a throw sufficient to register either one, one and one-half, two or three votes, according to the designation of the key.

In the construction illustrated in Fig. 1 there are certain rows designated to indicate officers, such as governor, secretary of state, etc., and it will be seen that there are nine rows designated "Members general assembly," this number being required to provide for voting for three candidates. It will be observed, moreover, that according to the illustration made in said Fig. 1 there are three nominations in the Republican column, namely, for Jones, Smith and Brown, and for each of the three candidates three keys are provided, the key marked 1 will register one vote, the key marked 1½ will register one and one-half votes, and the key marked 2 will register two votes. It will also be seen from the figure mentioned that there are two nominations for the Democratic party, White and Biggs, and that the Populist party has made one nomination, as George Adams, as has the Prohibition party, Tom Brown. Now, if the voter wishes to cast one and one-half votes for Jones and a similar number for Smith, he would operate key marked 1½ for Jones and Smith, whereas to cast a single vote for each of the candidates he would operate the three keys marked 1, or if he desired to cast three votes for Jones he would operate keys numbered 1 and 2. Obviously, in order to ascertain the total number of votes cast for Jones, it is necessary to add the number registered on all three of the counters actuated by those keys assigned to Jones.

In order to prevent the voter from operating keys in this series which would register an aggregate of more than three votes, I employ an interlocking mechanism which is very similar to that hereinbefore described, and, in fact, is identical in construction, but which differs therefrom in proportions, just as the throw imparted to the counters differs in extent from that necessary to cast a single vote. The mechanism required for this purpose is illustrated in Fig. 16, wherein the spreaders are of three different sizes and are marked, respectively, in the same way as the keys with which they are connected, namely, 1, 1½ and 2, the spreader designated 1 being one-half the width of the spreader marked 2, and the spreader 1½ being of intermediate dimensions so that if the voter should operate the key to which spreader No. 2 is connected, the locking blocks or disks will be separated to a greater extent than by the other spreaders and the total space provided for the reception of the spreaders will be taken up when the No. 2 spreader and No. 1 spreader have been operated, whether in that particular row or in either of the rows arranged in that group. It will be noted, also, that the space allowed for the spreading of the blocks will be fully occupied when two spreaders designated 1½ are operated to occupy a position in the guide.

To provide for voting a straight ticket in the Republican column, for instance, it will be necessary to withdraw all of the projections 102 except those which are carried by the No. 1 keys or those keys which are employed to cast a single vote for each of the three nominees for assemblymen. In the Democratic column it will be necessary to withdraw all of the projections 102 except those which are carried by the keys 1½ whereby when the straight-ticket lever is operated it will advance the two keys designated 1½. In the Populist column, as in the Prohibition column, it will be necessary to withdraw the projections 102 on the keys 1½ and leave those on the keys 1 and 2 projecting into the path of the straight-ticket bar.

Having described the invention, what I claim is—

1. A voting mechanism having a counter, and counter actuator operatively related therewith, an operating and resetting frame for communicating motion to the actuator, a setting device, and means on the counter actuator, controlled by the setting device and movable independently of the actuator into and out of the path of movement of the operating and resetting frame, for communicating motion from the latter to the counter actuator.

2. Voting mechanism having a counter, a counter actuator, an operating and resetting frame for communicating motion to the counter actuator, a setting element, and means carried by the counter actuator and controlled by the setting element and consisting of a projection movable independently of the counter actuator and adapted to be thrown by the setting element into and out of the path of the operating and resetting frame.

3. Voting mechanism having a counter, a counter actuator, an operating and resetting frame for communicating motion to the counter actuator, and an independent member mounted upon the actuator and arranged to be moved independently of the latter into and out of the path of movement of said operating and resetting frame, and a setting element operatively related with said member for moving the same into and out of operative position.

4. Voting mechanism having a counter, a counter actuator slide, an operating and resetting frame movable in a direction parallel with said slide, a transversely movable projection mounted upon the slide for movement into and out of the path of said frame, and a setting element operatively connected with said projection.

5. Voting mechanism having a counter, a counter actuator, an operating and resetting frame for the counter actuator, means carried by and movable independently of the actuator for movement into and out of the path of the operating device, a setting element connected with said means for moving it into and out of the path of the operating and resetting frame, and other means carried by the setting device for movement into the path of said operating and resetting frame by the operation of said setting element to extend the first-named means into the path of the operating and resetting frame.

6. Voting mechanism having a counter provided with a ratchet, a counter actuator, an operating device for the counter actuator, an arm having a pawl operatively related with said ratchet, and a cam carried by the actuator for operating said pawl-carrying arm.

7. Voting mechanism having a counter provided with a ratchet, a counter actuator, an operating device for the counter actuator, an arm having a pawl operatively related with said ratchet, a cam carried by the actuator for operating said pawl-carrying arm, a stop pawl, and a locking element operatively related with said stop pawl and arranged in the path of said pawl-carrying arm.

8. Voting mechanism having a counter provided with a ratchet, a counter actuator, an operating device for the counter actuator, an arm having a pawl operatively related with said ratchet, a cam carried by the actuator for operating said pawl-carrying arm, a stop pawl having a tail, and a locking element arranged in the path of said pawl-carrying arm and having a pin for engaging the tail of the stop pawl.

In testimony that I claim the foregoing as my own, I have hereto affixed my signature in the presence of two witnesses.

LENNA R. WINSLOW.

Witnesses:
    ACHILLE BAFFETTI,
    F. KULER.